Dec. 20, 1949     R. N. DOBLE     2,492,035
WEED PULLER
Filed Oct. 25, 1947
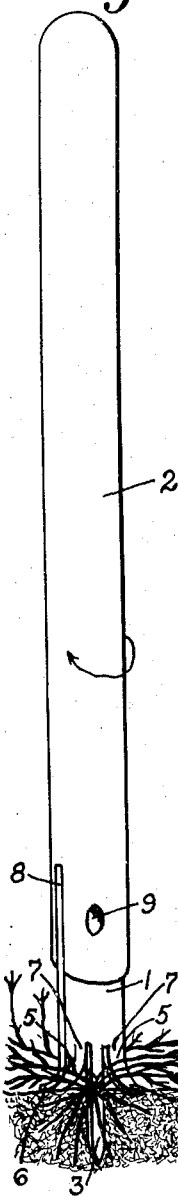
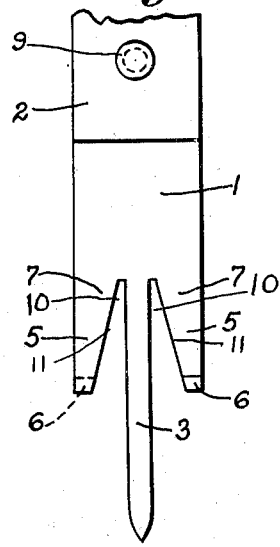
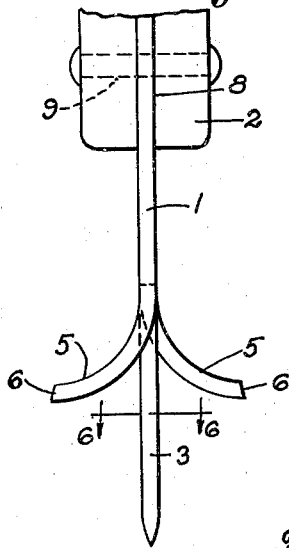
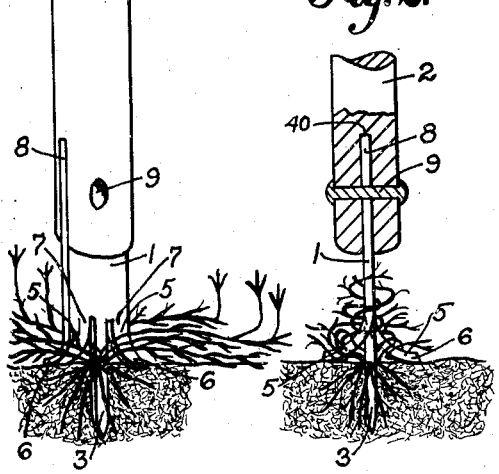
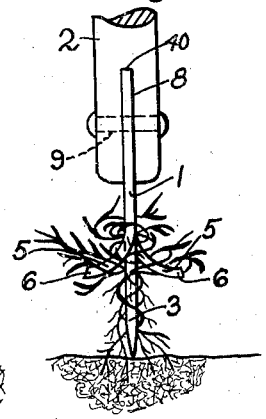
INVENTOR.
Ralph N. Doble
BY Heard Smith Tennant
Attorneys.

Patented Dec. 20, 1949

2,492,035

UNITED STATES PATENT OFFICE 2,492,035

WEED PULLER

Ralph N. Doble, Hingham, Mass.

Application October 25, 1947, Serial No. 782,082

3 Claims. (Cl. 294—50.6)

This invention relates to an implement for removing crab grass and other similar plant pests from lawns, and it has for its object to provide an improved implement for this purpose which is simple and inexpensive to manufacture, which is easy to manipulate, and which is extremely effective in removing the pest plant.

Another object is to provide an implement of this type by which the pest plant can be removed without injuring the lawn or producing any undesirable cavity in the lawn surface which subsequently has to be filled.

In order to give an understanding of the invention, I have illustrated in the drawings a selected embodiment thereof which will now be described, after which the novel features will be pointed out in the appended claims.

In the drawings,

Fig. 1 is a view of the implement showing the manner of its use.

Fig. 2 is an edge view of the lower end of the implement and illustrating the manner in which it functions, the lower end of the handle being shown in section.

Fig. 3 is a fragmentary view showing the manner in which the crab grass plant is withdrawn from the earth.

Fig. 4 is an enlarged front elevation of the lower end of the implement.

Fig. 5 is an enlarged edge view thereof.

Fig. 6 is a section on the line 6—6, Fig. 5.

Crab grass is one of the pest plants which often infest a lawn. This plant, which is an annual, grows with decumbent stems that lie on the ground, and the flowering ends of which rise vertically.

My improved implement for removing crab grass is provided with a central tine or prong adapted to be inserted into the earth at the root of the plant, and a plurality of curved laterally extending stem gathering prongs situated at the base of the central tine and adapted to rest on the ground when the central prong or tine has been inserted into the root of the plant. In the construction shown there are two stem gathering prongs and they curve downwardly and outwardly in opposite directions from the base of the central prong.

The laterally extending stem gathering prongs preferably have an increasing width from the tip toward the base, and these prongs have such relation to the central prong that they each form between themselves and the central prong a narrow wedge shaped throat. When the implement is used, the central prong is inserted into the ground at the root of the plant and by giving the implement a turning movement about the central prong as an axis the curved laterally extending prongs gather up the decumbent stems of the plant and crowd or wedge them into the narrow throats formed between the laterally extending prongs and the central prong so that by withdrawing the implement from the ground, the plant will be removed.

In the drawings I indicates the body of the implement which may for convenience be carried on the end of a handle 2 by which the implement may be manipulated. The body I is provided with a central prong or tine 3 which if desired may be flat sided to provide the sharp corners 4. The body is also formed with two or more curved laterally extending prongs 5 situated at the base of the center prong 3. In the illustrated embodiment of the invention there are two such prongs 5, and they are oppositely disposed and are situated on opposite sides of the center prong. Each prong 5 is preferably curved as shown so that the outer free end 6 thereof stands at substantially right angles to the center prong. The curved laterally extending prongs curve downwardly and outwardly from the base of the central prong and preferably have a progressively increasing width from the tip 6 to the base 7, and the inner edge 11 of each prong 5 has such relation to the center prong as to form therewith a narrow downwardly directed wedge shaped throat 10 at the base of said prongs.

The body I may be of any desired cross sectional shape, and as herein shown it is flat. The body may be fastened to the handle in any approved way, one simple construction being that herein shown wherein the end of the handle is provided with a transverse slot 8 in which the upper end of the body I is received, said body being secured to the handle by means of a rivet 9 which extends through the handle and through the body. The upper square end 40 of the body seats against the bottom of the slot 8, and thereby the body is firmly anchored in the handle.

In using the device the center prong 3 is sunk into the earth at the root of the plant to be removed as shown in Fig. 1 until the curved prongs 5 rest against the earth. The operator then gives the implement a partial turn by means of the handle 2, during which turning movement the sharp cornered prong 3 loosens the root of the plant while the curved prongs 5 engage and gather up the decumbent stems thereof, and force or wedge said stems into the narrow throats 10. The plant thus becomes firmly entangled with the implement so that when the implement is removed from the ground, the entire plant is carried with it as shown in Fig. 3. This removal of the plant is accomplished without removing any appreciable amount of soil from the lawn. The implement therefore serves to remove the pest plant without disfiguring the lawn or producing therein any cavity which subsequently has to be filled.

The individual crab grass plants can thus be readily removed by simply inserting the prong 3 into the earth at the root of the plant, giving the implement a partial turn by the handle, and then withdrawing the implement, operations which can be easily and effectively carried out by anyone.

While I have described the invention as it would be used in removing crab grass from lawns, yet I desire to state that the implement is also useful in removing other pest plants from lawns or gardens which have stems or leaves lying along the surface of the earth, and hence the reference to the use of the device in removing crab grass is not intended to import any limitations into the specification and claims as regards the use of the device.

I claim:

1. An implement for removing crab grass plants and the like from lawns comprising a body portion having at its end a central flat sided prong adapted to be inserted into the earth at the root of the plant, and also having two curved stem gathering prongs, one on each side of the central prong, each stem gathering prong curving downwardly and outwardly from the base of the central prong and adapted to rest on the ground when the central prong is inserted into the root of the plant, the downwardly extending portion of each stem gathering prong forming with the central prong a downwardly directed V-shaped throat whereby when the implement is given a partial turning movement the center prong loosens the roots of the plant while the curved prongs gather up the decumbent stems of the plant and direct them into said throats.

2. An implement for removing crab grass and other plants having decumbent stems comprising a body portion having at its end a central prong adapted to be inserted into the earth at the root of the plant and also having two stem gathering prongs, one on each side of the central prong, said stem gathering prongs curving downwardly and outwardly from the base of the central prong and adapted to rest on the ground when the central prong is inserted into the root of the plant, each stem gathering prong forming with the base of the central prong a narrow downwardly directed wedge shaped throat whereby when the implement is given a partial turning movement after the central prong has been inserted into the root of a plant, the curved prongs gather up the decumbent stems of the plant and force or wedge them into the narrow throats so that removal of the implement from the earth will take with it the crab grass or other plant.

3. An implement for removing crab grass and other plants having decumbent stems comprising a body portion having at its end a central root-loosening prong adapted to be inserted into the earth at the root of the plant and also having two curved stem gathering prongs, one on each side of the central prong, said stem gathering prongs curving downwardly and outwardly in opposite directions from the base of the central prong and adapted to rest on the ground when the central prong is thus inserted into the root of the plant, each curved prong having a progressively increasing width from its tip to its base and forming with the base of the central prong a relatively narrow downwardly directed V-shaped throat into which the decumbent stems of the plant are forced or wedged by the curved prongs when the implement is given a partial turning movement.

RALPH N. DOBLE.

REFERENCES CITED

The following references are of record in the file of this patent:

UNITED STATES PATENTS

| Number | Name | Date |
| --- | --- | --- |
| 843,399 | King | Feb. 5, 1907 |
| 2,194,336 | Tullio | Mar. 19, 1940 |